(12) United States Patent
Friedsam et al.

(10) Patent No.: US 7,152,405 B2
(45) Date of Patent: Dec. 26, 2006

(54) MAIN CYLINDER WITH INTEGRATED TRANSPORTATION LOCK

(75) Inventors: Ludwig Friedsam, Oberdürenbach (DE); Martin Struschka, Lahnstein (DE); Michael Geider, Urmitz (DE)

(73) Assignee: Lucas Automotive GmbH (DE)

( * ) Notice: Subject to any disclaimer, the term of this patent is extended or adjusted under 35 U.S.C. 154(b) by 21 days.

(21) Appl. No.: 11/084,077

(22) Filed: Mar. 18, 2005

(65) Prior Publication Data
US 2005/0229596 A1    Oct. 20, 2005

(30) Foreign Application Priority Data
Mar. 19, 2004  (DE) ............ 10 2004 013 662

(51) Int. Cl.
*B60T 11/20* (2006.01)
*B60T 11/16* (2006.01)
(52) U.S. Cl. ........................ 60/562; 92/128
(58) Field of Classification Search ............ 60/562, 60/568, 570; 91/373; 92/128
See application file for complete search history.

(56) References Cited

U.S. PATENT DOCUMENTS

| | | | | |
|---|---|---|---|---|
| 5,878,576 A | * | 3/1999 | Ishihara et al. | 60/562 |
| 6,012,288 A | * | 1/2000 | Gualdoni et al. | 60/562 |
| 6,381,959 B1 | | 5/2002 | Tsubouchi et al. | |
| 6,430,926 B1 | * | 8/2002 | Nakano et al. | 60/562 |
| 6,467,267 B1 | * | 10/2002 | Kanazawa et al. | 60/552 |
| 6,467,268 B1 | * | 10/2002 | Nakano et al. | 60/562 |
| 2005/0198954 A1 | * | 9/2005 | Konig et al. | 60/562 |

FOREIGN PATENT DOCUMENTS

| DE | 93 07 159 | 8/1993 |
|---|---|---|
| DE | 100 56 479 | 5/2001 |

OTHER PUBLICATIONS

Document Bibliography and Abstract for DE 100 56 479 from http://v3.espacenet.com/texdoc?DB=EPODOC &IDX=DE10056479&F=0, printed Jun. 6, 2005.

* cited by examiner

Primary Examiner—Thomas E. Lazo
(74) Attorney, Agent, or Firm—MacMillan, Sobanski & Todd, LLC

(57) ABSTRACT

A master cylinder for a vehicle hydraulic brake system has a housing with a bore formed therein, which is open at one end and in which a first pressure piston and a second pressure piston are guided sealingly and displaceably along an axis. Acting counter to an actuating direction upon the first pressure piston is a restrained first restoring spring and upon the second pressure piston a second restoring spring. In order, in a transportation or disassembly state of the master cylinder, to prevent the first pressure piston from being pressed excessively out of the bore, the second pressure piston is supported by means of a stop component counter to the actuating direction positively in the housing of the master cylinder.

7 Claims, 5 Drawing Sheets

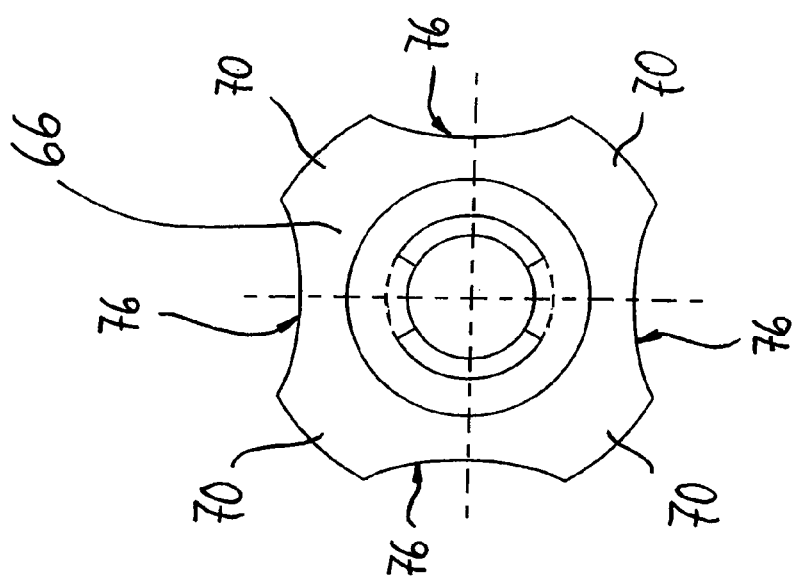
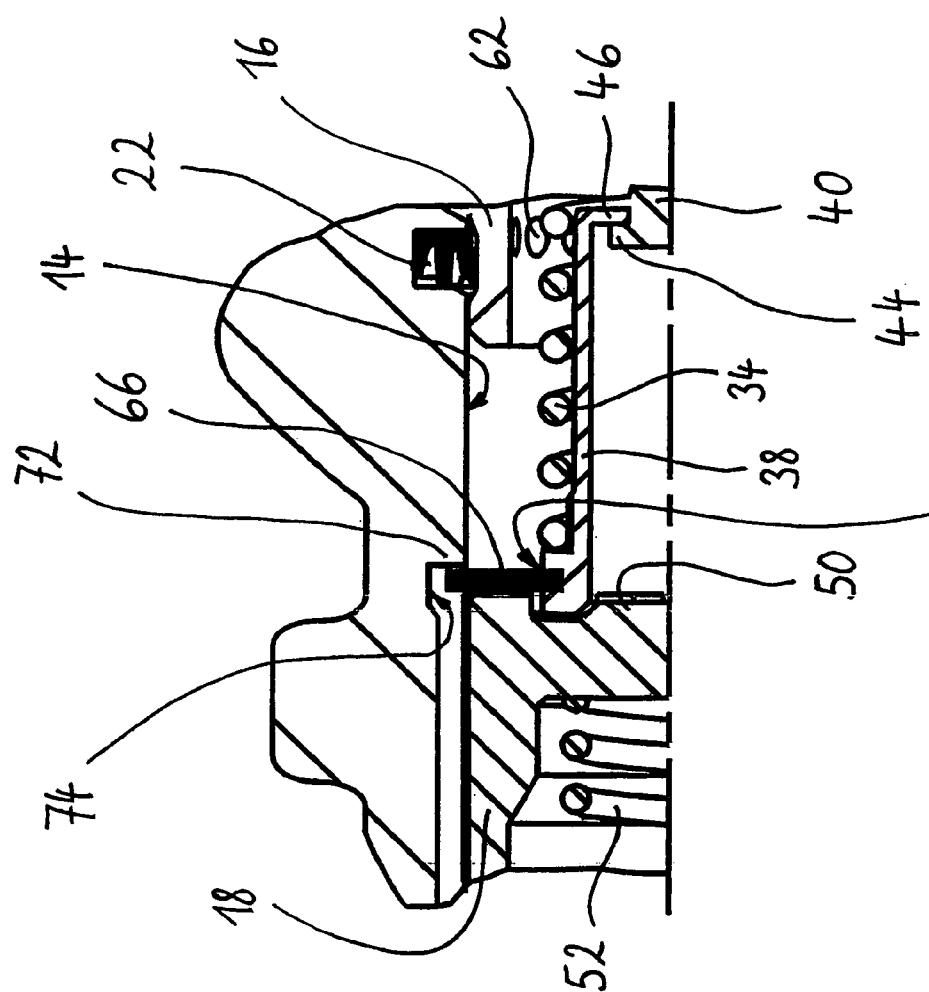
Fig. 3
Fig. 2

MAIN CYLINDER WITH INTEGRATED TRANSPORTATION LOCK

CROSS REFERENCE TO RELATED APPLICATIONS

This application is a continuation of German Patent Application No. 10 2004 013 662.9 filed Mar. 19, 2004, the disclosures of which are incorporated herein by reference in their entirety.

BACKGROUND OF THE INVENTION

The invention relates to a master cylinder for a vehicle hydraulic brake system, comprising a housing with a bore formed therein, which is open at one end and in which a first pressure piston and a second pressure piston are guided sealingly and displaceably along an axis of the master cylinder. Acting counter to an actuating direction upon the first pressure piston is a restrained first restoring spring and upon the second pressure piston a second restoring spring. The term "restrained" means that the first restoring spring may expand, not freely, but only to a specific extent that is defined by a restraint arrangement, which restrains the restoring spring.

Master cylinders of the described type have been known for some time. In the bore, the two pressure pistons delimit a first and a second pressure chamber, which in the operable state of the master cylinder are full of hydraulic fluid. Usually, the first pressure chamber is fluidically connected to a first brake circuit and the second pressure chamber to a second brake circuit of a vehicle brake system. In each brake circuit a plurality of wheel brakes are disposed. During a braking operation, the first pressure piston is displaced into the bore of the master cylinder housing in order to generate hydraulic pressure in the first pressure chamber. A hydraulic pressure arising in the first pressure chamber also displaces the second pressure piston further into the bore so that hydraulic pressure builds up likewise in the second pressure chamber. The hydraulic pressure generated in the two pressure chambers is supplied to the appropriate wheel brakes via the brake circuits connected to the pressure chambers. On completion of a braking operation, the force exerted by the two restoring springs effects a return of the pressure pistons to a normal and/or inoperative position. The exact function of such a master cylinder is well known to experts in this field and therefore requires no further explanation here.

The already mentioned restraint arrangement of the first restoring spring is used to adjust the position of both pressure pistons relative to one another. A precise adjustment of the position of the two pressure pistons relative to one another in the inoperative position is important so that during a braking operation the pressure build-up occurs simultaneously in both pressure chambers. The restraint arrangement limits the expansion of the first restoring spring and hence fixes the distance that exists in the inoperative position between the first pressure piston and the second pressure piston.

When the pressure pistons are in the said inoperative position, the restoring springs are not fully relaxed. This leads, when the master cylinder is not installed in the vehicle, i.e. when for example it is being transported to the vehicle manufacturer or disassembled for servicing purposes, to the unrestrained second restoring spring displacing the second pressure piston counter to the actuating direction in the bore. This movement is transmitted via the first restoring spring to the first pressure piston, which therefore in the worst-case scenario may drop entirely out of the bore of the master cylinder housing. Shaking and vibration during transportation additionally promote this undesirable occurrence.

For solving this problem, the use of a transport lock is known in principle. Conventional transport locks however have the drawback of being more or less elaborate and therefore time-consuming to remove before installation of the master cylinder into a vehicle may occur. In the case of disassembly of a master cylinder for servicing purposes, moreover, there is no longer a transport lock available for use.

BRIEF SUMMARY OF THE INVENTION

The underlying object of the invention is to indicate an improved master cylinder which, even without the use of a transport lock that has to be removed prior to installation of the master cylinder, during transportation or in the course of servicing work no longer leads to the described problem of a pressure piston falling out of the bore of the master cylinder housing.

According to a first form of construction of the present invention, starting with a master cylinder of the initially described construction this object is achieved according to the invention in that—in a transportation or disassembly state of the master cylinder—the second pressure piston is supported by means of a stop component counter to the actuating direction positively in the master cylinder housing. This prevents the second, unrestrained restoring spring from being able to slide the second pressure piston—and hence also the first pressure piston—beyond a constructionally defined extent out of the bore of the master cylinder housing. As the support according to the invention is provided in the master cylinder housing and does not interfere with operation of the master cylinder, there is no need for any kind of removal whatsoever of a transport lock before the master cylinder is installed and/or put into operation.

The stop component is preferably directed substantially radially outwards relative to the bore of the master cylinder housing. In a constructionally advantageous manner, for support against the housing there is a stop in the bore. Such a stop may be formed, for example, by a reduction of the diameter of the bore.

In preferred forms of construction of the master cylinder according to the invention, the stop component has a substantially annular-disk-like shape. In this way, the supporting force is distributed over a larger area and, above all, in peripheral direction.

The stop component is preferably made of elastic material. This enables easy introduction of the stop component into the bore of the master cylinder housing and subsequent latching behind e.g. a stop formed in the bore. According to a particularly preferred construction, such a stop component made of elastic material has a plurality of radial projections, which are arranged distributed in peripheral direction and which during introduction of the stop component into the bore latch behind a stop in the bore. Situated between the radial projections are fluid-permeable free spaces, so that portions of the bore that are situated in actuating direction behind the stop component may easily be vented.

In the case of a master cylinder where, for restraining the first restoring spring, i.a. a restraining sleeve having a foot adjacent to the second pressure piston is used, the stop component is preferably received in a peripheral groove of the foot of the restraining sleeve. The restraining sleeve in said case is advantageously manufactured from a plastics material, e.g. by injection moulding, and the peripheral groove receiving the stop component is produced during the injection moulding operation.

In the case of a master cylinder where, for restraining the first restoring spring, i.a. a restraining sleeve having a radially outwardly projecting flange adjacent to the second pressure piston is used, the stop component is preferably disposed along the restraining sleeve and is pressed by the first restoring spring against the flange of the restraining sleeve. Such a restraining sleeve may be made of a plastics material or alternatively comprise an e.g. deep-drawn sheet-metal part. In a modification of this embodiment, between the stop component and the end of the first restoring spring facing the stop component a clamping ring is additionally disposed, against which the first restoring spring is supported. By virtue of the clamping ring, a larger-area and hence more uniform support of the first restoring spring against the stop component is achieved. The material load arising during operation of the master cylinder is therefore advantageously reduced.

In the case of yet another master cylinder where, for restraining the first restoring spring, i.a. a restraining sleeve having a foot adjacent to the second pressure piston is used, this foot has a hollow-cylindrical base, in which a plurality of windows for receiving the stop component are formed, e.g. by deforming portions of the hollow-cylindrical base by bending them over in an outward direction. In this embodiment, the restraining sleeve preferably comprises a deep-drawn sheet-metal part.

According to a second form of construction of the present invention, starting with a master cylinder of the initially described construction the initially stated object is achieved according to the invention in that, for restraining the second restoring spring, each end thereof is supported against a tensioning plate, wherein the two tensioning plates are connected to one another in a tension-resistant manner by means of a cable, which extends through the second restoring spring. Such a restraint of the second restoring spring saves weight and is particularly economical to manufacture. For fastening the cable to the tensioning plates, each tensioning plate preferably has a recess, which tapers in the direction of the second restoring spring and through which the cable runs and into which fits a clamping element that is fastened, e.g. by crimping, on the respective end of the cable. In a constructionally advantageous variant of this form of construction, each tensioning plate has a radial slot, which extends from the recess to the outer edge of the tensioning plate and allows throughfeed of the cable. Given such a form of construction, therefore, the clamping elements may first be fastened to the cable and then the cable provided with the clamping elements may be inserted into the tensioning plates. Instead of using clamping elements, it is possible for the cable to be soldered or glued to each tensioning plate in order to fasten the cable to the tensioning plate.

According to a third form of construction of the present invention, starting with a master cylinder of the initially described construction the initially stated object is achieved according to the invention in that the first pressure piston protrudes from the bore and that the end of the first pressure piston protruding from the bore is supported counter to the actuating direction against rolled bellows, which are fastened to the housing of the master cylinder. In said case, the rolled bellows are preferably fixed in a peripheral groove in the outside of the housing close to the open end of the bore. The rolled bellows moreover preferably encompass the end of the first pressure piston protruding from the bore in that the rolled bellows overlap an end face disposed on the protruding end of the first pressure piston in order in this way to prevent the first pressure piston from falling out of the bore.

Other advantages of this invention will become apparent to those skilled in the art from the following detailed description of the preferred embodiment, when read in light of the accompanying drawings.

DETAILED DESCRIPTION OF THE INVENTION

Figure 1:
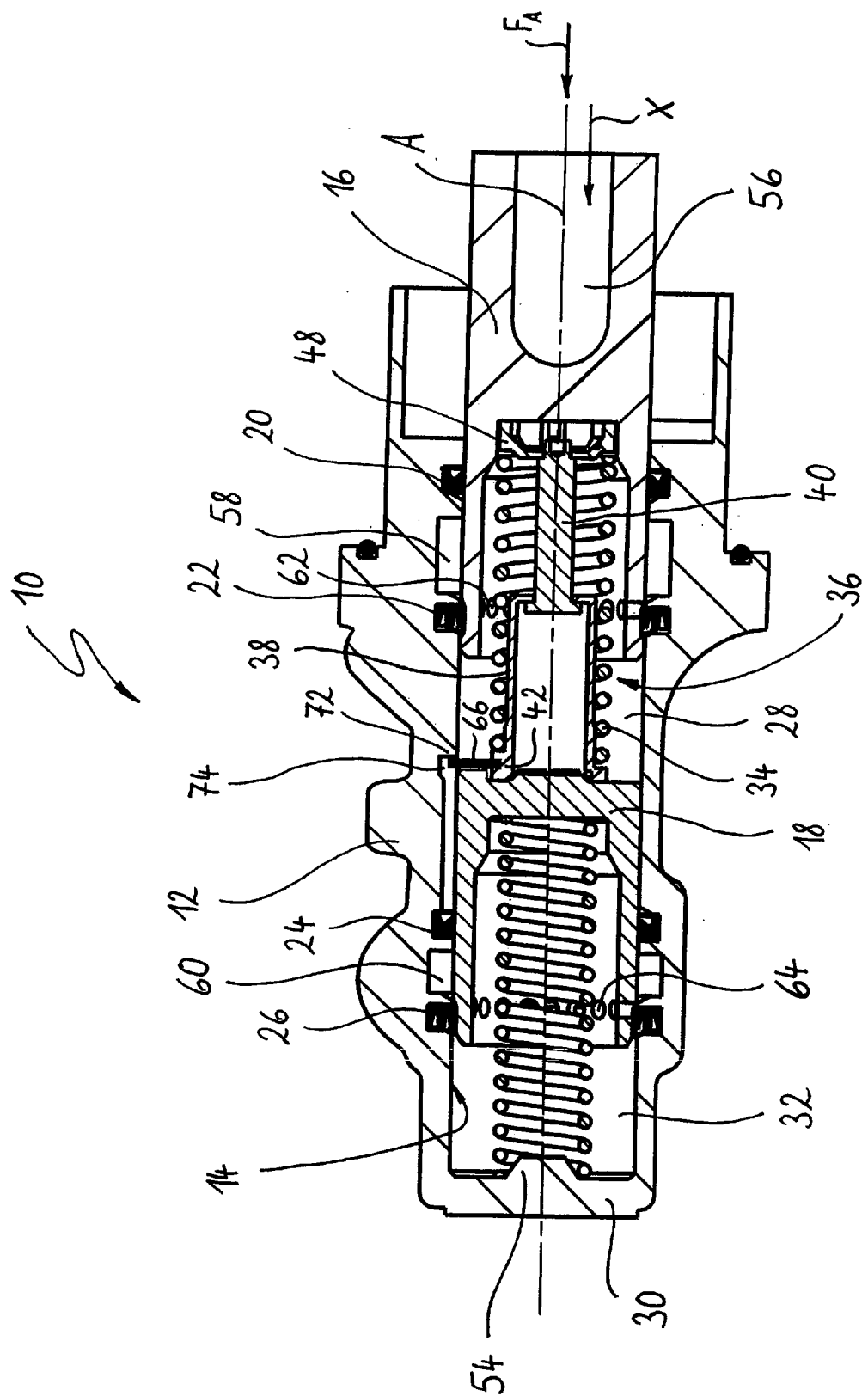
FIG. 1 a first form of construction in longitudinal section, wherein below the longitudinal centre line the master cylinder is shown in a conventional style of construction, i.e. without an integrated transport lock according to the invention, FIG. 2 a detail from FIG. 1 to an enlarged scale, FIG. 3 a plan view of an elastic stop component used in the first form of construction, FIG. 4 a detail view of a modification of the first form of construction, FIG. 5 a detail view of a further modification of the first form of construction, FIG. 6 a detail view of yet a further modification of the first form of construction, FIG. 7 a second form of construction in longitudinal section, FIG. 8 a detail of the second form of construction to an enlarged scale, and FIG. 9 a third form of construction in longitudinal section.

FIG. 1 shows in longitudinal section a first form of construction of a master cylinder 10 for a vehicle hydraulic brake system, which is often also referred to as a master brake cylinder. The master cylinder 10 has a housing 12, in which a bore 14 extends along an axis A and is open at its, in FIG. 1, right end.

Disposed displaceably in the bore 14 of the master cylinder housing 12 are a first pressure piston 16 and, at an axial distance from the first pressure piston 16, a second pressure piston 18. Sealing elements 20, 22 and 24, 26 disposed in undercuts of the bore 14 effect sealing between the outer peripheral surface of the first pressure piston 16 and of the second pressure piston 18 respectively and the bore 14.

Between the first pressure piston 16 and the second pressure piston 18 a first pressure chamber 28 is delimited in the bore 14 and is fluidically connected by a non-illustrated connection to a first brake circuit of the vehicle brake system. In an analogous manner, between the second pressure piston 18 and a base 30 of the bore 14 a second pressure chamber 32 is delimited and in the operative state of the master cylinder 10 is fluidically connected by a likewise non-illustrated connection to a second brake circuit of the vehicle brake system. Specific wheel brakes of a vehicle are associated with each brake circuit.

A first restoring spring 34 is disposed between the first pressure piston 16 and the second pressure piston 18 and biases the first pressure piston 16 into the inoperative or normal position reproduced in FIG. 1. For adjusting a defined distance between the first pressure piston 16 and the second pressure piston 18, the first restoring spring 34 is restrained by means of a restraint arrangement 36, i.e. the first restoring spring 34 may expand axially only to an extent limited by the restraint arrangement 36. Further axial expansion is prevented mechanically by the restraint arrangement 36.

The restraint arrangement 36 comprises, as main components, a restraining sleeve 38 and a restraining pin 40 connected thereto. The first restoring spring 34 extends along the outside of the restraining sleeve 38 and is supported by its one end against a foot 42 of the restraining sleeve 38. The restraining pin 40 is disposed displaceably in axial direction in the restraining sleeve 38. A collar 44 on the end of the restraining pin 40 situated in the restraining sleeve 38, in cooperation with a radially inwardly turned annular flange 46 of the restraining sleeve 38, limits the maximum extension of the restraining pin 40 out of the restraining sleeve 38. Fastened to the opposite free end of the restraining pin 40 is a support disk 48, against which the other end of the first restoring spring 34 is supported and which at its opposite side is in contact with the first pressure piston 16 in order to transmit the restoring force of the first restoring spring 34 to the first pressure piston 16.

The second pressure piston 18 engages with a truncated-cone-shaped projection 50 disposed centrally thereon into the foot 42 of the restraining sleeve 38 and in this way centres the, in FIG. 1, left part of the restraint arrangement 36.

A second restoring spring 52 is supported, centred by means of a further truncated-cone-shaped projection 54 at the bottom of the bore 14, against the base 30 of the bore 14 and presses with its opposite, other end against the inside of the hollow-cylindrical second pressure piston 18 in order to transmit a restoring force to the second pressure piston 18 and bias it into the inoperative and/or normal position shown in FIG. 1.

In the operating state, i.e. when installed in a vehicle, the presently illustrated master cylinder 10 is usually combined with a brake booster to form a unit (not shown). A force output element (not shown) of the brake booster in said case engages into a recess 56 of the first pressure piston 16 in order to transmit the boosting force generated by the brake booster to the first pressure piston 16. The master cylinder 10 in the operating state is moreover fluidically connected to a non-illustrated reservoir for hydraulic fluid, which may pass through annular replenishing chambers 58 and 60 as well as through perforations 62, 64 formed in the pressure pistons 16 and 18 into the first pressure chamber 28 and the second pressure chamber 32 respectively. The further exact structure and the function of such a master cylinder 10 and the components interacting therewith are well known to experts in this field and are therefore described here only to the extent necessary for understanding the present invention.

In order, when the master cylinder 10 is in the state shown in FIG. 1, in which there is no brake booster connected to the master cylinder 10, to prevent the first pressure piston 16 from being pressed under the action of the second restoring spring 52 too far out of the bore 14, an annular stop component 66 here made of elastic material is provided, which in the embodiment illustrated in FIGS. 1 and 2 is held in a peripheral groove 68 formed in the outside of the foot 42 of the restraining sleeve 38 and extends radially outwards relative to the longitudinal centre line A. In this connection, it should be pointed out that, for a better comparison with the background art, FIG. 1 is divided in two and shows, below the longitudinal centre line A, a conventional master cylinder 10 without the stop component 66 and, above the longitudinal centre line A, a form of construction according to the invention with the stop component 66.

The precise structure of the stop component 66 emerges more clearly from FIG. 3. From FIG. 3 it may be seen that the substantially annular-disk-shaped stop component 66 in the presently illustrated embodiment has four arm-like radial projections 70, which in the installed state of the stop component 66 may interact with a stop 72 that is formed by an annular undercut 74 in the bore 14 of the master cylinder housing 12. In the inoperative position of the master cylinder 10 reproduced in FIG. 1, the free ends of the radial projections 70 are pressed by the second pressure piston 18 against the stop 72, i.e. the second pressure piston 18 is supported counter to an actuating direction X of the master cylinder 10 via the stop component 66 and the stop 72 positively in the housing 12 of the master cylinder 10. In this state, the force of the second restoring spring 52 is therefore introduced into the master cylinder housing 12 and is therefore no longer able to press the first pressure piston 16 further out of the bore 14.

The elastic design of the stop component 66 makes it possible to slide the first pressure piston 16, together with the restraint arrangement 36 and the stop component 66 mounted thereon, into the bore 14 of the master cylinder housing 12 until the radial projections 70 latch behind the stop 72 formed by the undercut 74. At the outer periphery of the stop component 66, recesses 76 are disposed between the radial projections 70 and, during introduction of the stop component 66 into the bore 14, allow fluid to flow past and, in the installed state, enable a venting of the part of the bore 14 situated in actuating direction behind the stop component 66.

During operation of the master cylinder 10, i.e. when an input force $F_A$ is exerted on the first pressure piston 16 in order to displace it into the bore 14, the stop component 66 disengages from the stop 72. The displacement of the two pressure pistons 16 and 18 is not affected by the stop component 66 because its maximum radial dimension is selected such that no contact arises between the stop component 66 and the wall of the bore 14 during operation of the master cylinder 10.

Figure 4:
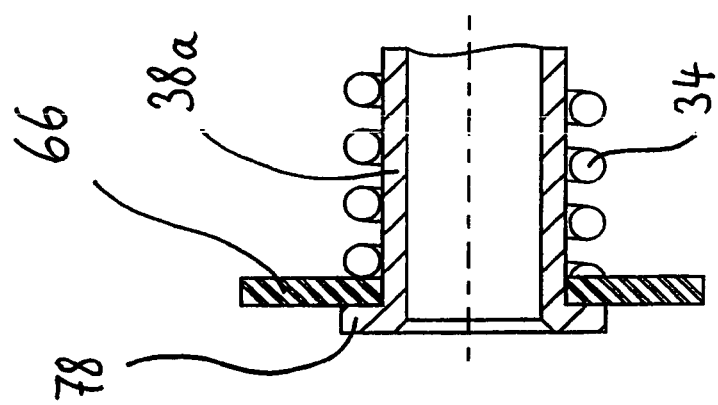

FIG. 4 shows a slightly modified mounting of the stop component 66 on a restraining sleeve 38a. The restraining sleeve 38a has on its free end a radially outwardly projecting peripheral flange 78, against which the first restoring spring 34 presses the stop component 66. The function of the stop component 66 is not altered thereby.

Figure 5:
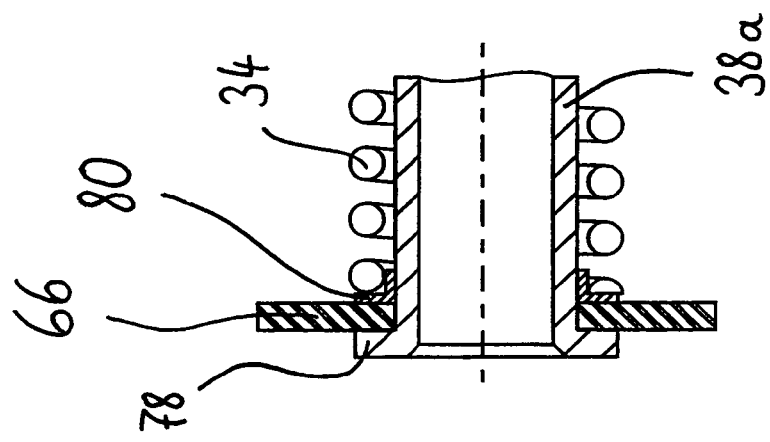

FIG. 5 shows an arrangement of the stop component 66 similar to FIG. 4, only now there is additionally a clamping ring 80 disposed between the stop component 66 and the end of the first restoring spring 34 facing the stop component 66. The clamping ring 80 here has an approximately L-shaped cross section and extends along the restraining sleeve 38a. By virtue of the clamping ring 80, the pressing force of the first restoring spring 34 is distributed over a greater area and hence more uniformly over the stop component 66, which helps to prolong its life. Here too, the function of the stop component 66 corresponds to that already described above.

Figure 6:
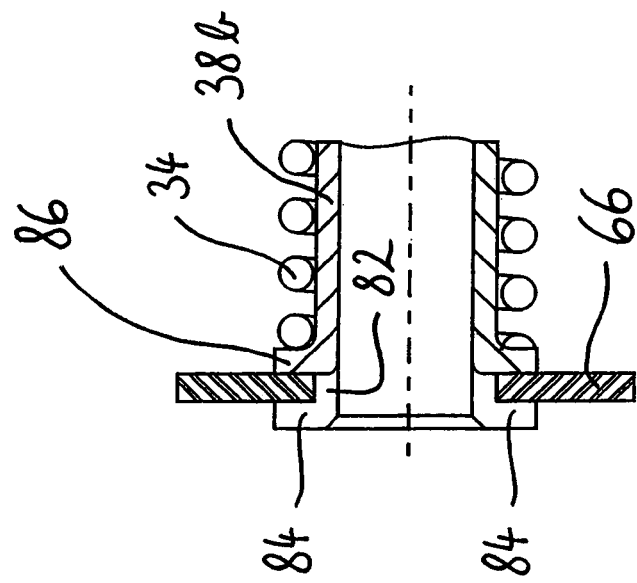

FIG. 6 shows yet another way of mounting the stop component 66. A restraining sleeve 38b has a foot 42 with a hollow-cylindrical base 82, in which a plurality of windows 84 for receiving the stop component 66 are formed, e.g. by bending parts of the hollow-cylindrical base 82 over in an outward direction. Such a deformation process leads to the formation of radially outwardly projecting bending extensions 86, against which the stop component 66 accommodated in the windows 84 may be supported. In this embodiment, the restraining sleeve 38b is preferably a deep-drawn sheet-metal part. A construction of plastics material in the form of an injection-moulded part is equally possible.

Figure 7:
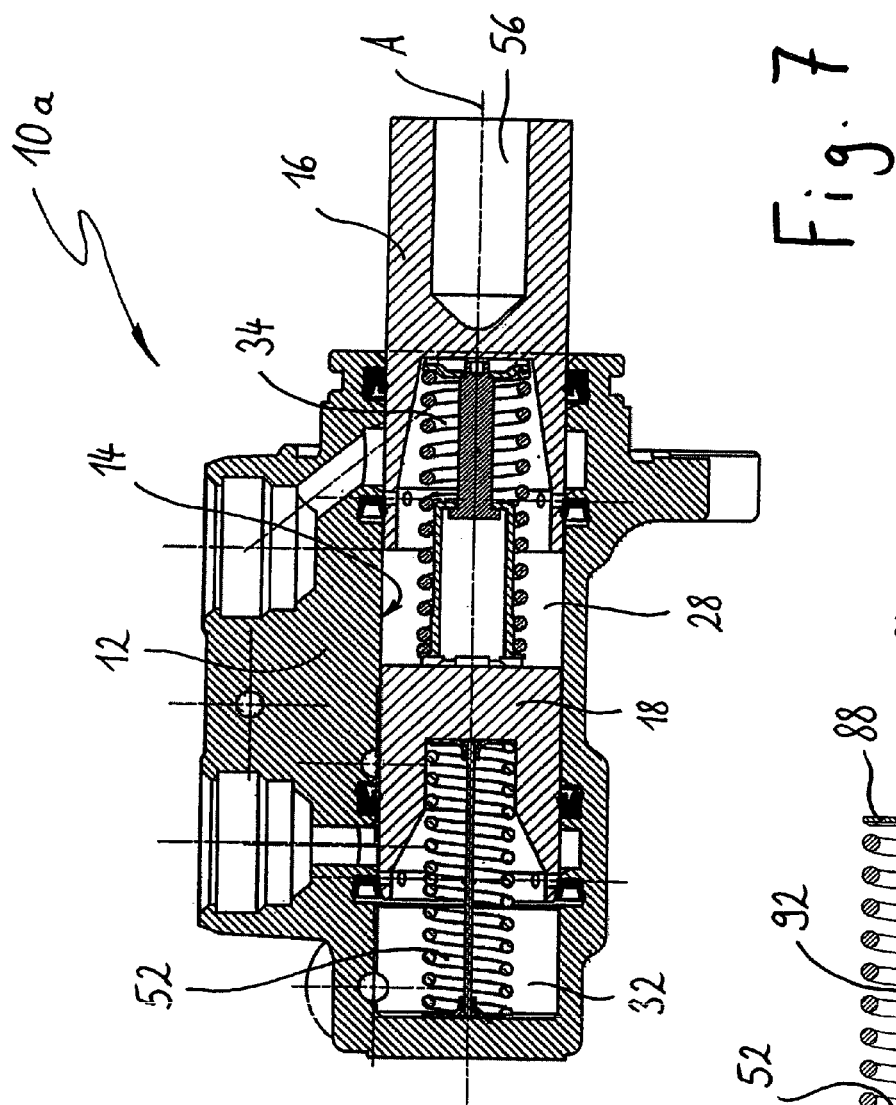
Figure 8:
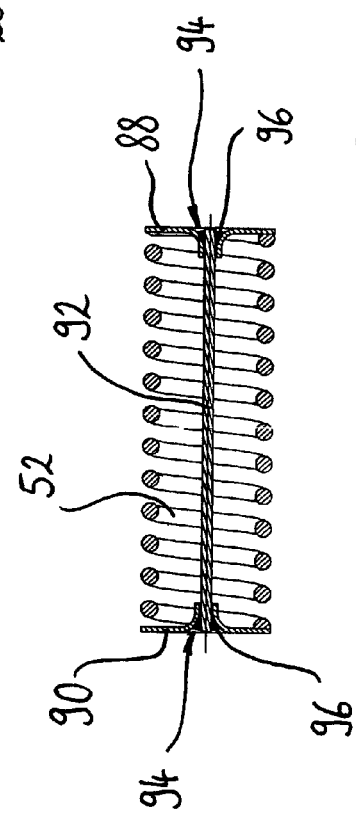

FIGS. 7 and 8 show a master cylinder 10a similar to the master cylinder 10 of FIG. 1, only without a stop component 66. Instead of this, an excessive outward pressing of the first pressure piston 16 is prevented by also restraining the second restoring spring 52. For this purpose, each end of the second restoring spring 52 is supported against a tensioning plate 88, 90 and the two tensioning plates 88, 90 are connected to one another in a tension-resistant manner by means of a cable 92 extending through the second restoring spring 52. For fastening the cable 92 to the tensioning plates 88, 90, each tensioning plate 88, 90 has an, in the present case, centrally disposed recess 94, which tapers in the direction of the second restoring spring 52 and through which the cable 92 runs. Clamping elements 96, which are preferably of a complementary shape to the recesses 94 and are fastened e.g. by crimping on the cable 92, fit into the recess 94 and through positive locking produce the desired tension-resistant connection. For easier assembly, each tensioning plate 88, 90 may have a slot (not shown here), which extends from the recess 94 to the outer edge of the tensioning plate and through which the cable 92 may be introduced. Such a construction makes it possible to fasten the clamping elements 96 on the cable 92 and then insert the cable 92 into the tensioning plates 88, 90.

Figure 9:
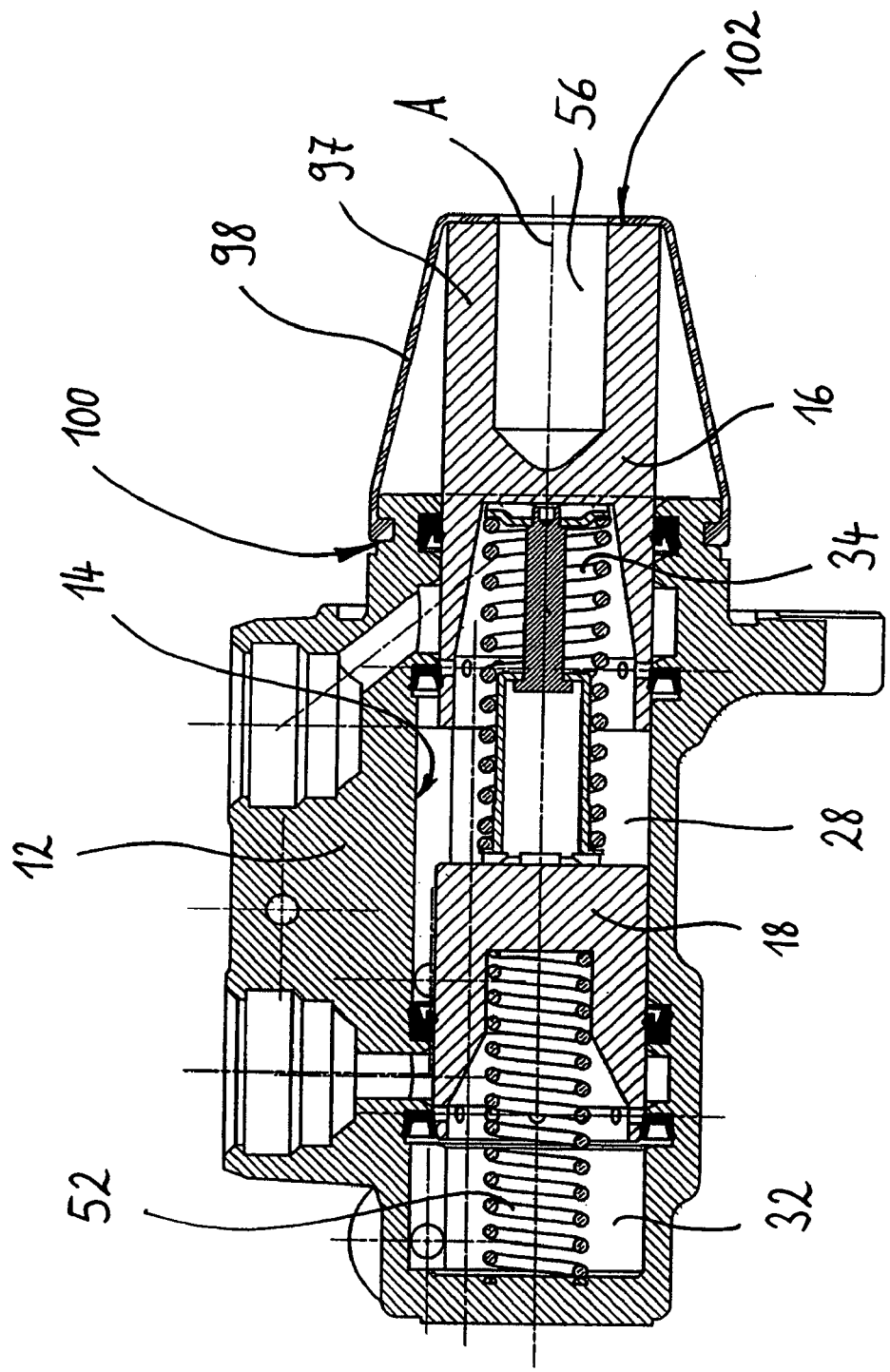

FIG. 9 shows in longitudinal section a master cylinder 10b similar to the previously discussed master cylinder 10a of FIG. 7. Unlike the master cylinder 10 and the master cylinder 10a, the master cylinder 10b comprises neither a stop component 66 nor a restrained second restoring spring 52. Instead, as a solution to the described problem, the first pressure piston 16 is supported by its end 97 protruding from the bore 14 counter to the actuating direction against rolled bellows 98, which is fastened to the outside of the housing 12 of the master cylinder 10. In the illustrated embodiment, the rolled bellows 98 made of elastic material is fixed by its one end in a peripheral groove 100 in the outside of the housing 12 close to the open end of the bore 14, while its opposite, other end encompasses and/or overlaps an end face 102 disposed on the protruding end 97 of the first pressure piston 16. In terms of interference, the additional resistance generated by the rolled bellows 98 during operation of the master cylinder 10b has no detrimental effect.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Master cylinder for a vehicle hydraulic brake system, comprising a housing with a bore formed therein, which is open at one end and in which a first pressure piston and a second pressure piston are guided sealingly and displaceably along an axis; and a restrained first restoring spring acting counter to an actuating direction upon the first pressure piston, and a second restoring spring acting counter to the actuating direction upon the second pressure piston, wherein the second pressure piston in a transportation or disassembly state of the master cylinder, is supported by means of a stop component counter to the actuating direction positively against a stop in the bore of the housing;

the stop component is made of elastic material; and the stop component has a plurality of radial projections, which during introduction of the stop component into the bore latch behind the stop.

2. Master cylinder according to claim 1, wherein the stop component is directed substantially radially outwards relative to the bore.

3. Master cylinder according to claim 1, wherein the stop component has a substantially annular-disk-like shape.

4. Master cylinder according to claim 1, wherein a restraining sleeve having a foot adjacent to the second pressure piston is used for restraining the first restoring spring wherein the stop component is accommodated in a peripheral groove of the foot.

5. Master cylinder according to claim 1, wherein a restraining sleeve having a radially outwardly projecting flange adjacent to the second pressure piston is used for restraining the first restoring spring, wherein the stop component is disposed along the restraining sleeve and is pressed by the first restoring spring against the flange.

6. Master cylinder according to claim 5, wherein a clamping ring is disposed between the stop component and the end of the first restoring spring facing the stop component.

7. Master cylinder according to claim 1 wherein a restraining sleeve having a foot adjacent to the second pressure piston is used for restraining the first restoring spring, which foot has a hollow-cylindrical base, in which a plurality of windows for receiving the stop component are formed.

* * * * *